(12) United States Patent
Zang et al.

(10) Patent No.: US 7,780,412 B2
(45) Date of Patent: Aug. 24, 2010

(54) OPERATING A WIND TURBINE AT MOTOR OVER-TEMPERATURE CONDITIONS

(75) Inventors: Xiaoyun Zang, Shanghai (CN); Dong Wang, Shanghai (CN); Meng Gao, Shanghai (CN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/473,714

(22) Filed: May 28, 2009

(65) Prior Publication Data
US 2010/0143116 A1   Jun. 10, 2010

(51) Int. Cl.
*F03D 7/02* (2006.01)
(52) U.S. Cl. .............................. 416/1; 416/130; 416/148
(58) Field of Classification Search ...................... 416/1, 416/17, 26, 29, 33, 47, 48, 60, 130, 148
See application file for complete search history.

(56) References Cited
U.S. PATENT DOCUMENTS

| | | | |
|---|---|---|---|
| 4,339,666 A | 7/1982 | Patrick et al. | |
| 6,600,240 B2 * | 7/2003 | Mikhail et al. | 307/85 |
| 6,703,718 B2 * | 3/2004 | Calley et al. | 290/44 |
| 7,095,129 B2 | 8/2006 | Moroz | |
| 2002/0000723 A1 | 1/2002 | Weitkamp | |
| 2004/0135375 A1* | 7/2004 | Wobben | 290/44 |
| 2006/0273595 A1 | 12/2006 | Avagliano et al. | |
| 2007/0018457 A1 | 1/2007 | Llorente Gonzalez | |
| 2008/0086281 A1 | 4/2008 | Santos | |
| 2008/0112807 A1 | 5/2008 | Uphues et al. | |

* cited by examiner

*Primary Examiner*—Igor Kershteyn
(74) *Attorney, Agent, or Firm*—Edward J. Smith; Ernest G. Cusick; Frank A. Landgraff

(57) ABSTRACT

Methods and apparatus for continuing wind turbine operation when normal wind turbine motor control is unavailable due to overheating of one or more wind turbine control motors. Technical effects of the present invention include providing an effective control strategy continuing operation during over-heating of a wind turbine control motor, such as a pitch control motor and a yaw control motor.

20 Claims, 6 Drawing Sheets

OPERATING A WIND TURBINE AT MOTOR OVER-TEMPERATURE CONDITIONS

BACKGROUND OF THE INVENTION

This invention relates generally to wind turbines, and more particularly to methods and apparatus for operating the wind turbines with over-temperature conditions on wind turbine control motors.

Recently, wind turbines have received increased attention as an environmentally safe and relatively inexpensive alternative energy source. With this growing interest, considerable efforts have been made to develop wind turbines that are reliable and efficient.

Generally, a wind turbine includes a rotor having multiple blades. The rotor is mounted on a housing or nacelle, which is positioned on top of a truss or tubular tower. Utility grade wind turbines (i.e., wind turbines designed to provide electrical power to a utility grid) can have large rotors (e.g., 50 or more meters in diameter). Blades on these rotors transform wind energy into a rotational torque or force that drives one or more generators, rotationally coupled to the rotor through a gearbox or directly coupled to the rotor. The gearbox, when present, steps up the inherently low rotational speed of the turbine rotor for the generator to efficiently convert mechanical energy to electrical energy. The electrical energy may be sent directly or through electrical converters into a utility grid.

Up until the recent past, control systems for wind turbines often initiated turbine trips or shutdown sequences as a simple response to faults or abnormal conditions. As wind turbines comprise a greater segment of the total power fed into the utility grid, the reliability and continuity of power from the wind turbines become increasingly important to the continuity of operation on the grid. Further, the continuity of operation of wind turbines becomes a more significant economic factor to windfarm operators and utility operators. More complex responses to the faults or abnormal conditions may be devised that might provide for non-interrupted wind turbine output. Accordingly, it may be desirable to provide operating methods and control features that provide for continuity of wind turbine operation during fault or abnormal conditions.

BRIEF DESCRIPTION OF THE INVENTION

The present invention provides a method and apparatus for maintaining continuity of wind turbine operation during over-temperature conditions on one or more wind turbine control motors, such as a pitch control motor for wind turbine blades, or a yaw control motor for controlling orientation of the nacelle with respect to the wind.

Briefly in accordance with one aspect of the present invention, a method of operating a wind turbine, including a wind turbine generator, a converter and at least one rotor blade is provided in response to an over-temperature condition on a wind turbine control motor. The method includes monitoring a temperature of one or more wind turbine control motors, and monitoring a wind speed for the wind turbine. The method further includes controlling operation of the wind turbine according to a wind turbine control function when the temperature of the wind turbine control motor is normal. If the temperature for one or more of the wind turbine control motors exceeds a first predetermined temperature, then the method includes modifying the wind turbine control function for continuing operation of the wind turbine under a modified operating scheme one or more of the wind turbine control motors. Normal operation of the wind turbine according to the wind turbine control function is restored when the temperature of the affected wind turbine control motor falls below the first predetermined temperature.

In accordance with another aspect of the present invention, a wind turbine is provides. The wind turbine includes a wind turbine generator operatively connected through a rotor shaft to a rotor hub including at least one rotor blade and one or more wind turbine control motors. A wind turbine control system is adapted for controlling operation of the wind turbine, including an operating scheme for the one or more wind turbine control motors. A control function of the wind turbine control system is adapted for continuing operation of the wind turbine under a modified operating scheme for the wind turbine control motors when an operating temperature of one or more wind turbine motor exceeds a first predetermined temperature. A temperature measurement system is provided for the wind turbine control motors, wherein a temperature measurement each of the wind turbine control motors is provided to the control function of the wind turbine control system

BRIEF DESCRIPTION OF THE DRAWING

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

The following embodiments of the present invention have many advantages, including allowing a wind turbine to continue operation during an over-temperature condition for a wind turbine control motor, such as a pitch control motor or a yaw control motor.

The present invention is directed to methods and apparatus for continuing wind turbine operation when normal wind turbine motor control is unavailable due to overheating of one or more wind turbine control motors. Technical effects of the present invention include providing an effective control strategy for recovering from over-heating of a wind turbine control motor.

Figure 1:
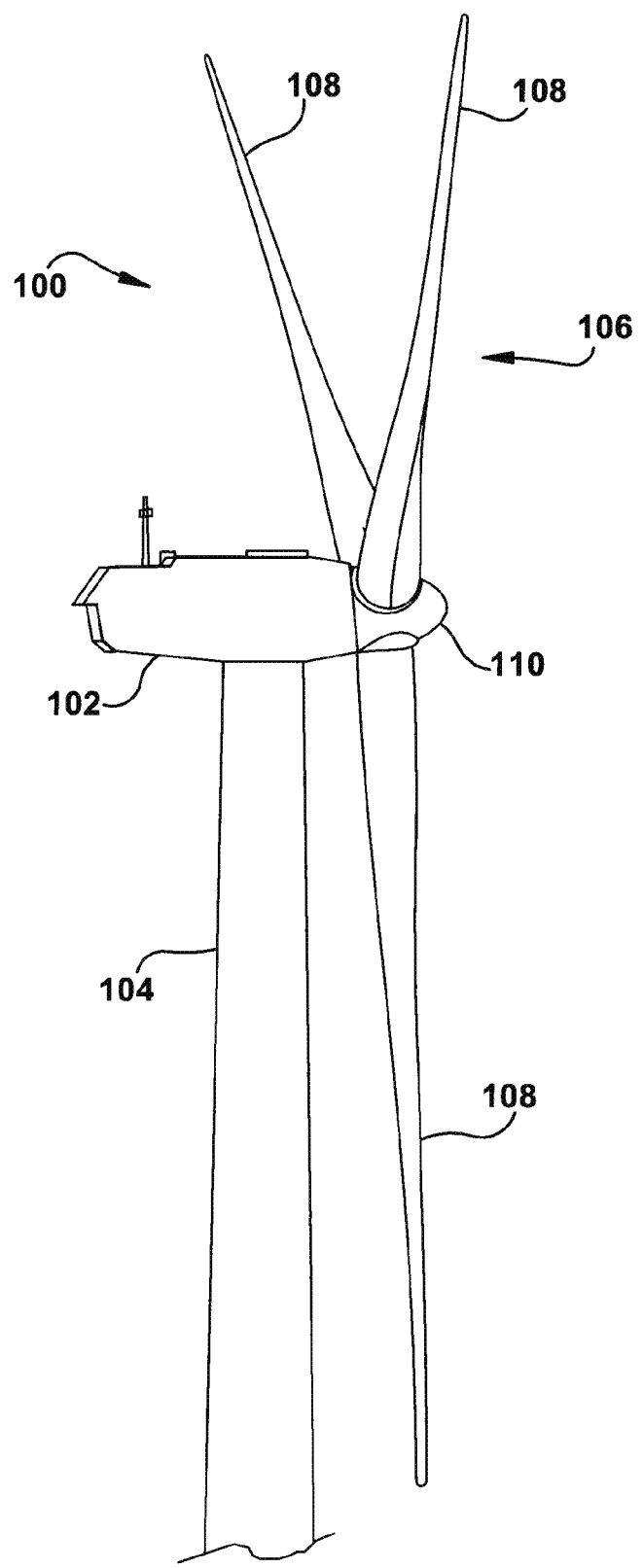
FIG. 1 illustrates an exemplary configuration for a wind turbine.

In some configurations and referring to FIG. 1, a wind turbine 100 comprises a nacelle 102 housing a generator (not shown in FIG. 1). Nacelle 102 is mounted atop a tall tower 104, only a portion of which is shown in FIG. 1. Wind turbine 100 also comprises a rotor 106 that includes a plurality of rotor blades 108 attached to a rotating hub 110. Although wind turbine 100 illustrated in FIG. 1 includes three rotor blades 108, there are no specific limits on the number of rotor blades 108 required by the present invention.

Figure 2:
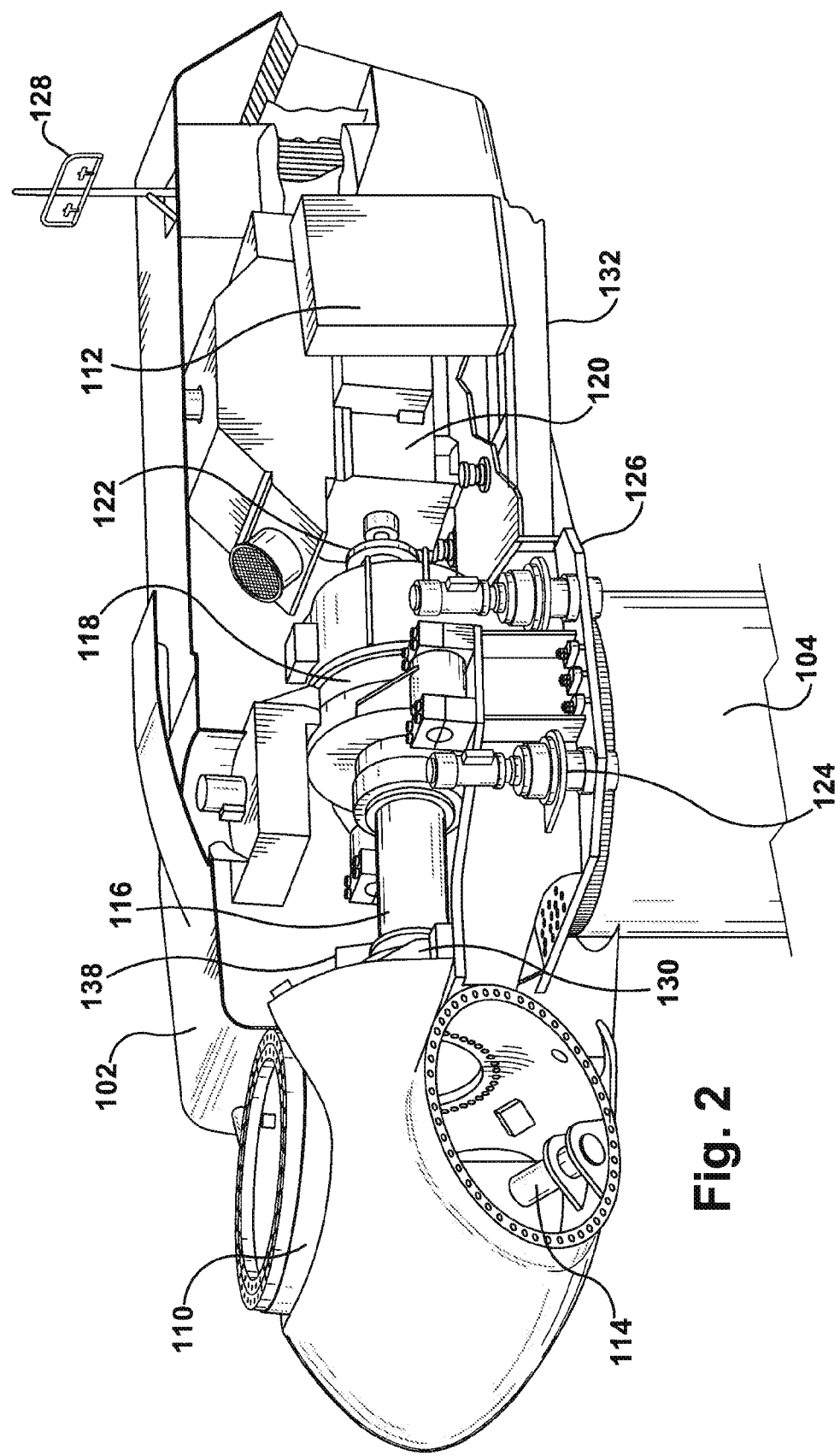
FIG. 2 illustrates a cut-away perspective view of a nacelle of the exemplary wind turbine.

In some configurations and referring to FIG. 2, various components are housed in nacelle 102 atop tower 104 of wind turbine 100. The height of tower 104 is selected based upon factors and conditions known in the art. In some configurations, one or more microcontrollers within control panel 112 comprise a control system are used for overall system monitoring and control including pitch and speed regulation, high-speed shaft and yaw brake application, yaw and pump motor application and fault monitoring. Alternative distributed or centralized control architectures are used in some configurations.

In some configurations, the control system provides control signals to a variable blade pitch drive 114 to control the pitch of blades 108 (not shown in FIG. 2) that drive hub 110 as a result of wind. In some configurations, hub 110 receives three blades 108, but other configurations can utilize any number of blades. In some configurations, the pitches of blades 108 are individually controlled by blade pitch drive 114. Hub 110 and blades 108 together comprise wind turbine rotor 106.

The drive train of the wind turbine includes a main rotor shaft 116 (also referred to as a "low speed shaft") connected to hub 110 and a gear box 118 that, in some configurations, utilizes a dual path geometry to drive a high-speed shaft enclosed within gear box 118. The high-speed shaft (not shown in FIG. 2) is used to drive a first generator 120 that is supported by main frame 132. In some configurations, rotor torque is transmitted via coupling 122. First generator 120 may be of any suitable type, for example and without limitation, a wound rotor induction generator. Another suitable type by way of non-limiting example is a multi-pole generator that can run at the speed of the low speed shaft in a direct drive configuration, without requiring a gearbox.

Yaw drive 124 and yaw deck 126 provide a yaw orientation system for wind turbine 100. In some configurations, the yaw orientation system is electrically operated and controlled by the control system in accordance with information received from sensors used to measure shaft flange displacement. Either alternately or in addition to the flange displacement measuring sensors, some configurations utilize a wind vane 128 to provide information for the yaw orientation system. The yaw system is mounted on a flange provided atop tower 104.

Figure 3:
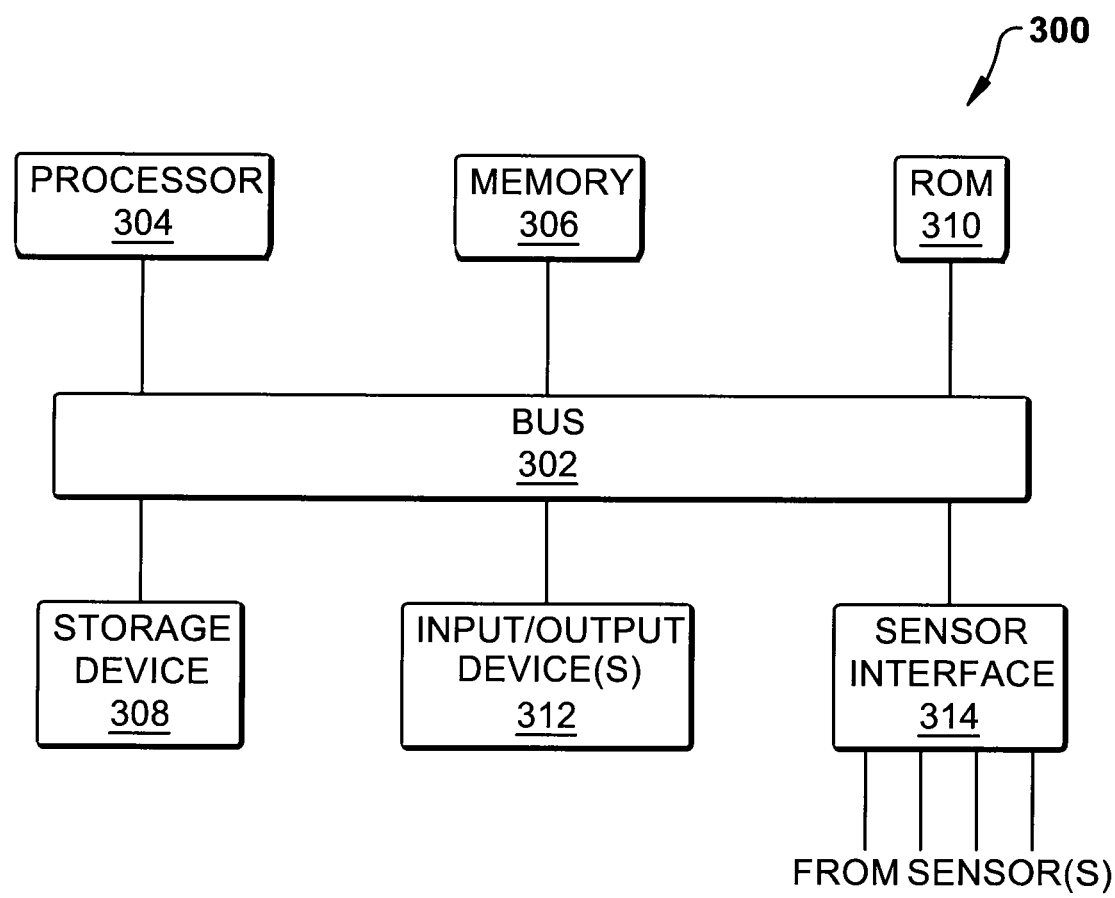
FIG. 3 is a block diagram of an exemplary configuration of a control system for a wind turbine configuration as shown in FIG. 1

In some configurations and referring to FIG. 3, a control system 300 for wind turbine 100 includes a bus 302 or other communications device to communicate information. Processor(s) 304 are coupled to bus 302 to process information, including information from sensors configured to measure displacements or moments. Control system 300 further includes random access memory (RAM) 306 and/or other storage device(s) 308 that may be coupled to bus 302 to store and transfer information and instructions to be executed by processor(s) 304. RAM 306 (and also storage device(s) 308, if required) can also be used to store temporary variables or other intermediate information during execution of instructions by processor(s) 304. Control system 300 can also include read only memory (ROM) and or other static storage device 310, which is coupled to bus 302 to store and provide static (i.e., non-changing) information and instructions to processor(s) 304. Input/output device(s) 312 can include any device known in the art to provide input data to control system 300 and to provide yaw control and pitch control outputs. Execution of sequences of instructions is not limited to any specific combination of hardware circuitry and software instructions. Sensor interface 314 is an interface that allows control system 300 to communicate with one or more sensors. Sensor interface 314 can be or can comprise, for example, one or more analog-to-digital converters that convert analog signals into digital signals that can be used by processor(s) 304.

The pitch control system includes pitch drives 114. Coordinate transformation, bias estimation methods, and/or other control techniques known in the art can be used in various configurations by control system 300 to determine a pitch increment for each rotor blade 108 to reduce overall asymmetric rotor loading. Classical and modern control techniques that can be utilized to command cyclic blade control are known in the art and do not need to be described further herein.

According to prior art control, some pitch and yaw faults such as a pitch control motor over-temperature and yaw control motor over-temperature can cause the wind turbine control system to trip the wind turbine off the line. When the wind turbine is tripped, the output power is lost to the windfarm and the grid. The loss of the output power results in an economic loss to the windfarm operator and a reduction of power to the grid.

Such a safety response may be needed to prevent wind turbine overspeed or overtorque when the pitch of the wind turbine blades could not be controlled or the rotor could not be aligned with the wind direction because the pitch control motor or yaw control motor was overheated. Slight overheating of these wind turbine control motor can lead over the long-term to deterioration of motor winding insulation. Extremely high temperature of the wind turbine control motor windings can lead to rapid damage and failure of the motors. While it would be possible to completely replace the pitch control motor and/or yaw control motor and the associated gearsets with upgraded units that would avoid overheating, such changeouts would be expensive and time-consuming.

Sometimes, these wind turbine control motors do not have a failure that leads to overheating, but rather overheat due to over-work in responding to wind conditions such as excessive gusting, frequent changes of wind direction, and the like. Such wind conditions may cause the control system to constantly pitch the wind turbine blades and yaw the nacelle, causing the associated wind turbine control motors to overheat.

According to the present invention, a method is provided that permits the pitch control motor to rest while the wind turbine continues to operate, albeit at a reduced power output, when the pitch motor temperature exceeds a first predetermined value. Specifically, instead of the pitch control motor continuously responding to the normal output from the control system setting a pitch angle based on wind conditions, the control system will provide a fixed pitch angle command and allow the blades to remain at the fixed pitch angle, while the pitch control motor rests and cools. However, if the pitch control motor temperature rises above a second predetermined value that is above the first predetermined value, then the turbine is shutdown to prevent overheating damage to the pitch control motor.

The fixed pitch angle is larger than the normal value for pitch angle that would be provided by the control system based on wind conditions. With the larger fixed pitch angle, the output power of the wind turbine will be reduced. However, converter torque control can be optimized based on the fixed pitch angle and the wind speed to maximize the power output for the fixed pitch angle. After a sufficient rest time for the pitch control motor, the pitch control can be restored to normal operation with design pitch control and full power output. The sufficiency of the rest time may be established based on a measured temperature for the pitch control motor returning to an acceptable temperature value below the first predetermined temperature or allowing a sufficient time of rest such that the temperature of the pitch control motor should return to the acceptable value. The method provides a good balance between wind turbine protection and power production.

Figure 4:
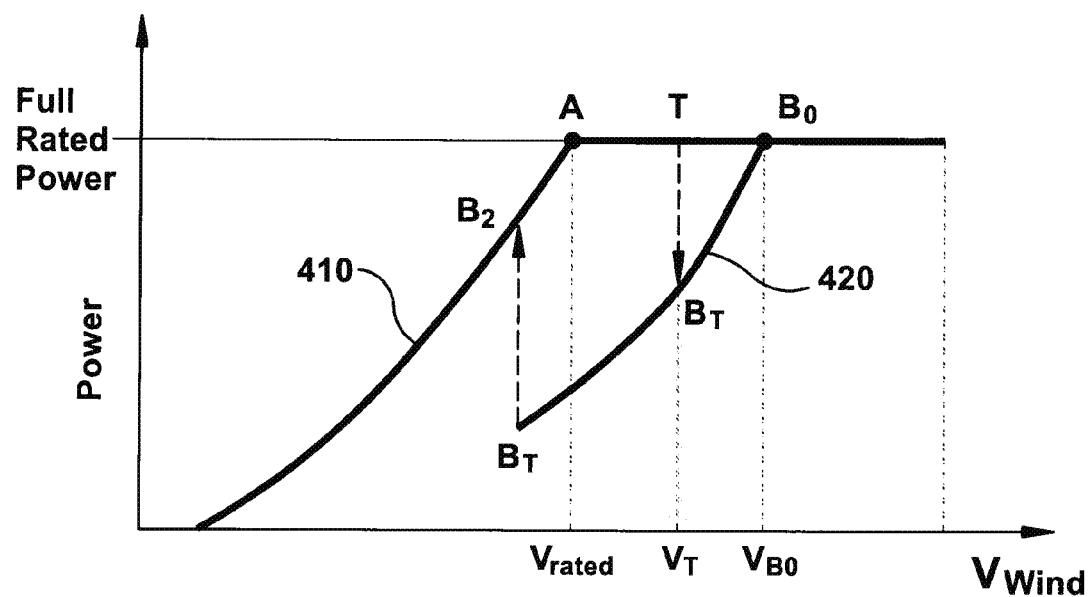
FIG. 4 illustrates a relationship between power production and wind speed under normal pitch control and derated pitch control.
Figure 5:
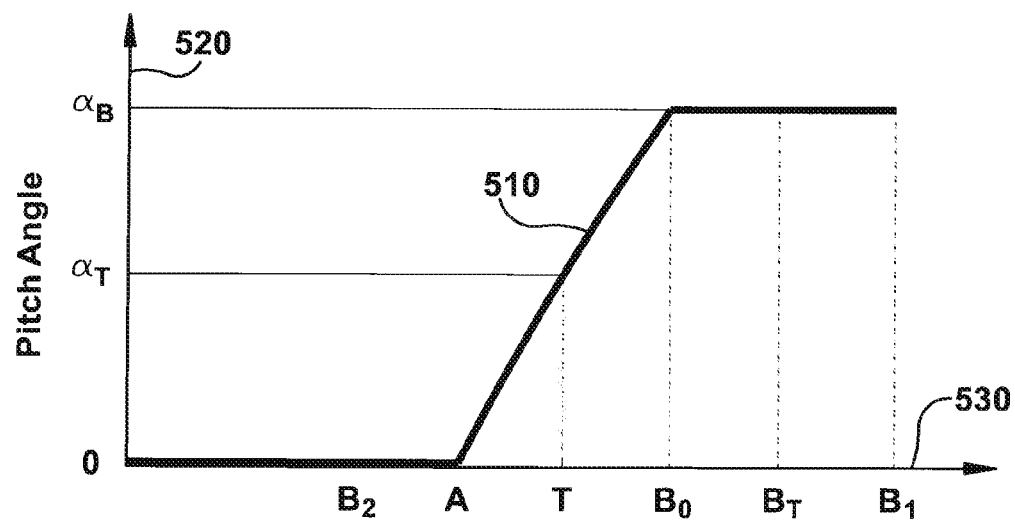
FIG. 5 illustrates a pitch angle for the different points of FIG. 4.

FIG. 4 illustrates a relationship between power production and wind speed under normal pitch control and derated pitch control. Curve $B_2ATB_0$ 410 illustrates power production versus wind speed for operation under normal pitch control. Curve $B_1B_TB_0$ 420 illustrates derated power production versus wind speed under a fixed pitch angle $\alpha_B$ (where $\alpha_B$ is larger than $\alpha_T$). FIG. 5 curve 510 illustrates a pitch angle 520 for the different operating points 530 of FIG. 4.

According to FIG. 4, at wind speed $V_T$ and normal pitch control, full power output is delivered at pitch angle $\alpha_T$. On the occurrence of an over-temperature fault for the pitch motor, the pitch angle $\alpha_B$ is established causing the power output from the wind turbine to drop to $B_T$. Operation with fixed pitch angle $\alpha_B$ provides reduced power output along the $B_1B_TB_0$ curve, however the operation provides for continuity of wind turbine operation while the pitch control motor rests at the fixed pitch angle and cools down. If the wind speed were to increase above $V_{B0}$, then it may be necessary to further feather the pitch angle to prevent overloading. If temperature of the pitch control motor returns to below the over-temperature condition, then pitch control may be restored to normal. Alternatively, the control function may restore normal pitch operation after a predetermined time period, wherein the time is set to allow for cooling.

More specifically, the wind turbine control system's control function for the pitch control motor may energize the pitch control motors to establish the fixed pitch angle $\alpha_B$ if the temperature of the pitch control motor exceeds a first predetermined temperature. The first predetermined temperature may be based on limiting long-term damage to the motor windings due from overheating as is known in the art. If the temperature of the pitch control motor exceeds a second predetermined temperature, which is higher than the first predetermined temperature, then a fault condition may cause the wind turbine to trip or shutdown. The second predetermined temperature may be one where damage to the pitch control motor would occur rapidly as is known in the art.

The fixed pitch angle $\alpha_B$ may be chosen in consideration of the wind velocity in a time period prior to the over-temperature fault condition. The wind turbine system may include a wind speed measurement device, a wind speed recording function, and a determination of a range of wind speed in the period to the over-temperature condition on the wind turbine control motor. The fixed pitch angle $\alpha_B$ may be chosen to prevent wind turbine overload or overstress based on the range of wind speed history.

Similarly, according to the present invention, a method is provided that permits the yaw control motor to rest while the wind turbine continues to operate, albeit at a reduced power output. Because the rotor blades of the wind turbine may no longer be aligned with the wind direction, the wind turbine and its blades may be subjected to asymmetric loading. Similar to the pitch control method, if the temperature of the yaw control motor exceeds a first predetermined temperature, yaw control motor operation may be stopped while the yaw control motor cools. The control function for yaw may be returned to normal operation when the temperature of the yaw control motor cools below the first predetermined temperature. If the temperature of the yaw control motor exceeds a second predetermined temperature, wherein the second predetermined temperature is above the first predetermined temperature, then the wind turbine may be tripped or shutdown.

During operation of the yaw control motor at a temperature above the first predetermined temperature, the control function for pitch may be adjusted to prevent overstress of the wind turbine components due to misalignment with the wind while the yaw control motor is being rested. Such modification to the pitch control while yaw control is rested may include a larger pitch angle for a given wind condition range or a fixed pitch angle for operation while yaw control is rested.

Figure 6:
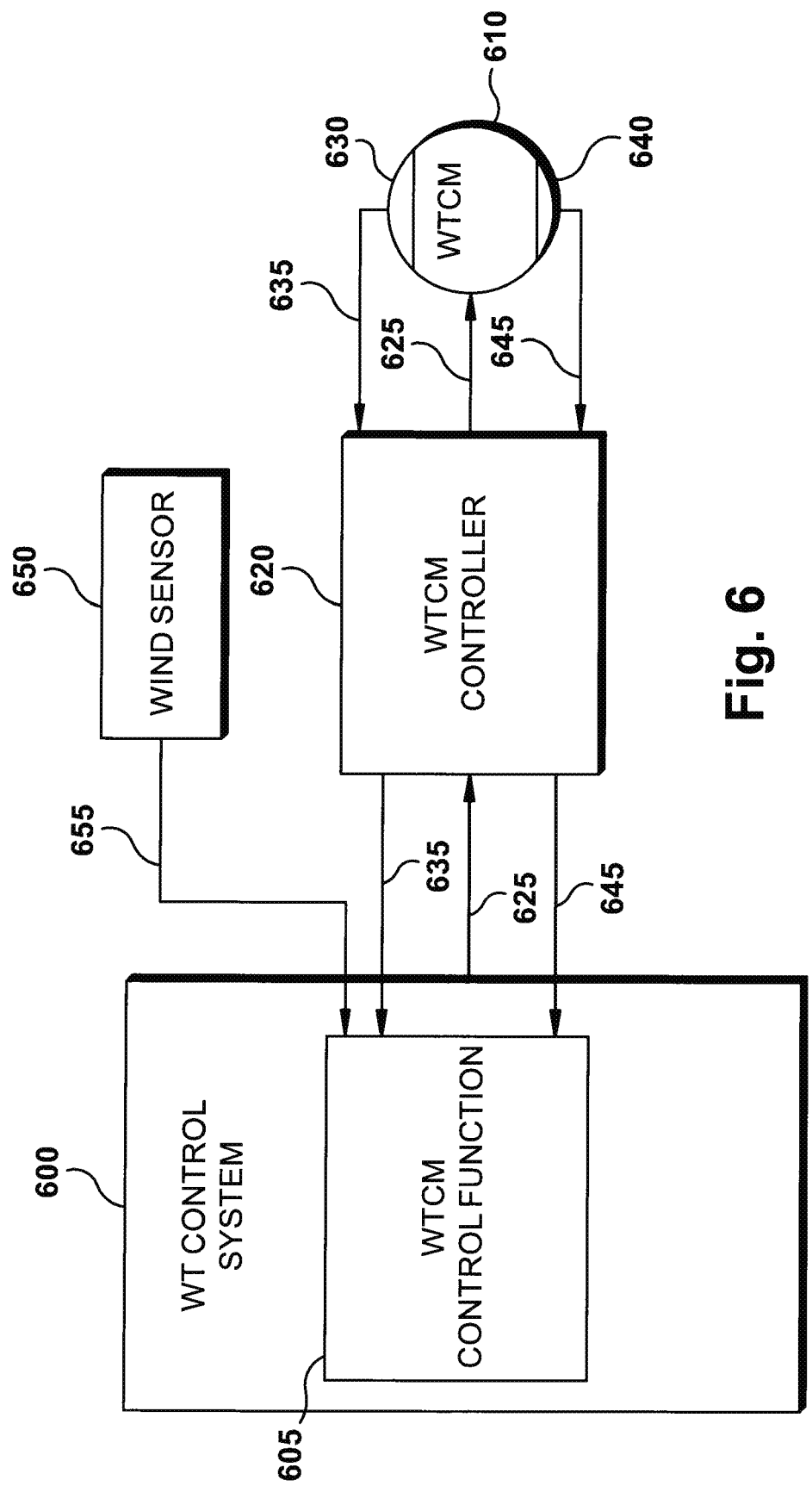
FIG. 6 illustrates an exemplary configuration of a control function for the inventive response to an over-temperature condition for a wind turbine control motor.

FIG. 6 illustrates an exemplary configuration of a control system 600 for the inventive response to an over-temperature condition for a wind turbine control motor. The control system 600 as broadly described in FIG. 3 may further include a control function 605 for responding to an over-temperature condition on the wind turbine control motor (WTCM) 610. The control function 605 may provide a signal 625 to a WTCM controller for normal operation and over-temperature operation of the WTCM 610. The WTCM 610 may be a dc motor driven by a voltage 626 generated within or controlled by the WTCM controller 620 or may be an ac motor driven by voltage 626 controlled by WTCM controller.

The WTCM 610 may further include a temperature sensor 630, such as but not limited to a resistance temperature detector. The temperature sensor 630 may be built into the WTCM 610 so as to sense the temperature of the motor windings. The control system may further include a control motor position sensor 640. The control motor position sensor 640 may sense rotation of the motor from which the position of the controlled output through gearing may be inferred, such as a position of a rotor blade (FIG. 1) or rotation of the yaw deck (FIG. 2). The rotor blade position or the yaw deck rotation may further be sensed by dedicated sensors (not shown) inputting to the control system.

A motor temperature signal 635 and a motor position sensor signal 645 are provided to the WTCM control function 605 through WTCM controller 620. A wind sensor 650 may provide information signal 655 to the WTCM control function 605 on the speed and direction of the wind for determination of safe setting of the fixed pitch angle during overheating of the WTCM. The WTCM control function 605 may include in memory a first predetermined temperature and a second predetermined temperature against which the WTCM temperature signal 635 may be compared for initiation of response to the over-temperature condition.

Figure 7:
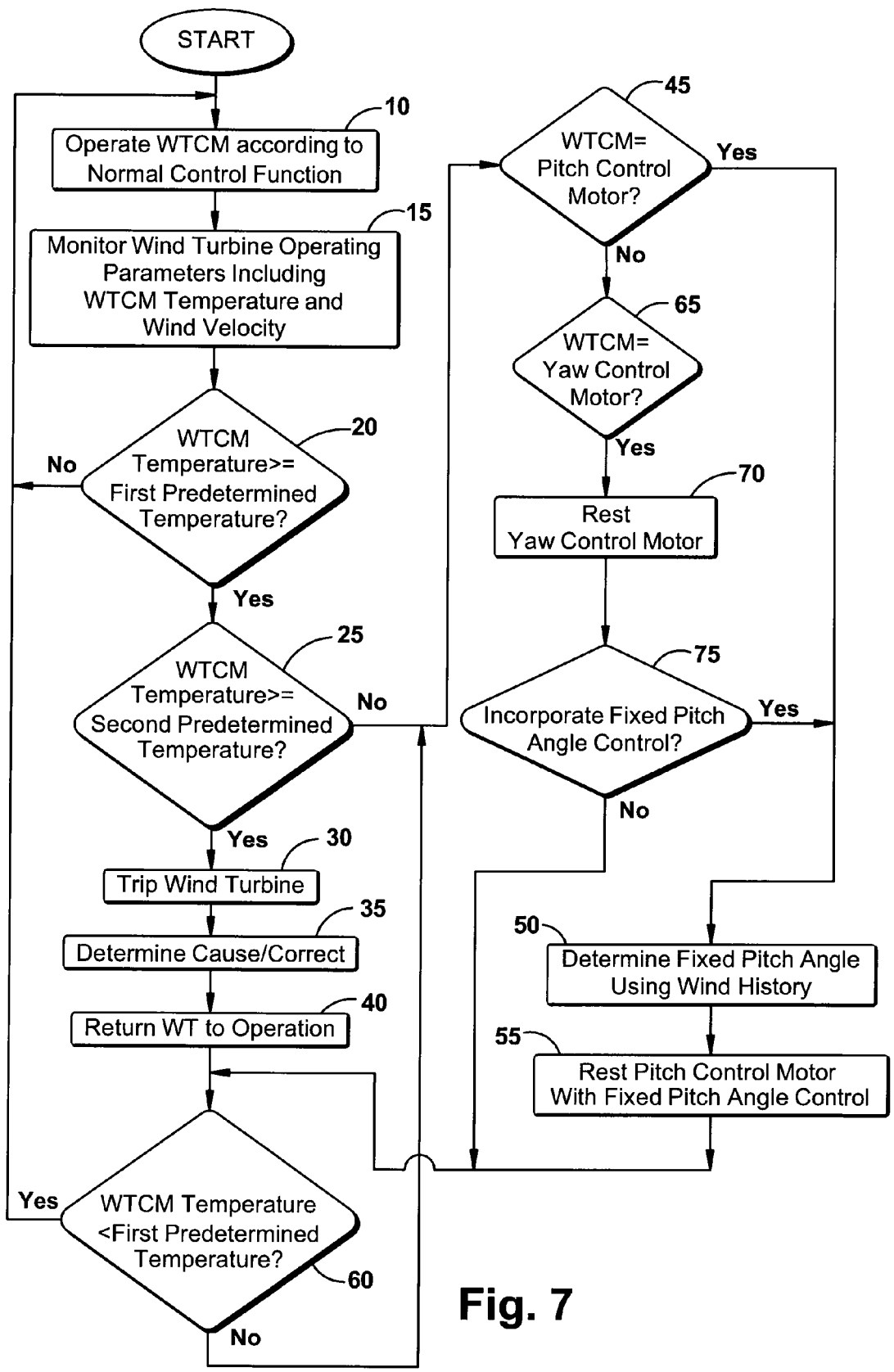
FIG. 7 illustrates a flowchart for a method for continued operation with over-temperature on wind turbine control motors.

FIG. 7 illustrates a flow chart for operation of the pitch control and yaw control during over-temperature conditions on wind turbine control motors. In step 10 the wind turbine control motor (WTCM) is operated according to a normal control system functioning, generally known in the art. In step 15, wind turbine parameters are monitored for control of the WTCM including motor winding temperature and wind conditions in proximity to the wind turbine. In step 20, it is determined if the temperature of the WTCM exceeds a first predetermined temperature. If the first predetermined temperature is not exceeded, then operation in accordance with the normal wind turbine control function continues according to step 10. If the first predetermined temperature is exceeded, it is determined in step 25 whether a higher second predetermined temperature for the WTCM is exceeded.

If the second predetermined temperature is exceeded, then the wind turbine is tripped in step 30 to prevent damage to the WTCM. In step 35, the cause of the over-temperature fault is determined and corrected. In step 40, the wind turbine is returned to service with monitoring per step 10.

In step 25, if the WTCM temperature has not exceeded the second predetermined temperature, then it is determined in step 45 if the WTCM is a pitch control motor. If the WTCM is a pitch control motor, then a modified control function determines, in step 50, a fixed pitch angle for continued wind turbine operation employing previous wind history prior to the over-temperature event. In step 55, the pitch control motor establishes the fixed pitch angle previously determined and turbine operation continues while the pitch control motor rests. In step 60, if the temperature for the WTCM has returned below the first predetermined temperature, then normal operation of the WTCM is restored in step 10. If the temperature for the WTCM remains at or above the first predetermined temperature, then operation continues under the resting sequence for the motor at step 45.

If the WTCM is a yaw control motor in step 65, then the yaw control motion is stopped to allow time for cooling according to the modified control function. Further in step 75, according to the modified control function for operation with an overheated yaw control motor, it may be decided to operate the pitch control motor at a fixed pitch angle for continued operation while the yaw motor rests. If the temperature for the yaw control motor returns below the first predetermined temperature in step 60, then normal WTCM operation is restored in step 10.

It will thus be appreciated that configurations of the present invention provide an effective control strategy to accommodate operation during over-temperature conditions for a wind turbine control motor. The continued operation during the over-temperature condition provides a limited output power from the wind turbine, which would not otherwise be available. Further, the present invention provides for return to full power output for the wind turbine when the over-temperature condition on the wind turbine control motor ends.

While the invention has been described in terms of various specific embodiments, those skilled in the art will recognize that the invention can be practiced with modification within the spirit and scope of the claims.

The invention claimed is:

1. A method of operating a wind turbine in response to an over-temperature condition on a wind turbine control motor, the wind turbine including a wind turbine generator, a converter and at least one rotor blade, the method comprising:
   monitoring a temperature of at least one wind turbine control motor;
   monitoring a wind speed for the wind turbine;
   controlling operation of the wind turbine according to a normal wind turbine control function when the temperature of the at least one wind turbine control motor is below a first predetermined temperature;
   modifying the wind turbine control function for continuing operation of the wind turbine under an operating scheme for the at least one wind turbine control motor when the temperature of the at least one wind turbine motor exceeds the first predetermined temperature; and
   restoring normal operation of the wind turbine according to the wind turbine control function when the temperature of the at least one wind turbine motor falls below the first predetermined temperature.

2. The method of claim 1, further comprising: shutting down the wind turbine when the temperature of the at least one wind turbine control motor exceeds a second predetermined temperature, wherein the second predetermined temperature is above the first predetermined temperature.

3. The method of claim 1, the step of monitoring a temperature of at least one wind turbine control motor comprises: monitoring a winding temperature of the control motor for the wind turbine.

4. The method of claim 1, the step of monitoring a wind speed comprising:
   measuring the wind speed in proximity to the wind turbine;
   recording a history of the wind speed in proximity to the wind turbine;
   determining a range of wind speeds for a time period prior to the temperature exceeding the first predetermined temperature for the at least one wind turbine control motor.

5. The method according to claim 2, wherein the at least one wind turbine control motor comprises at least one pitch control motor.

6. The method according to claim 5, step of modifying further comprising:
   setting a pitch angle for all pitch control motors of the wind turbine to a larger fixed angle when the temperature for at least one pitch control motor ranges above the first predetermined temperature and below the second predetermined temperature.

7. The method according to claim 6, the step of setting a pitch angle further comprising: setting the larger fixed angle according to the range of wind speeds prior to the temperature for the at least one wind turbine control motor exceeding the first predetermined temperature.

8. The method according to claim 7, further comprising: optimizing converter torque control for the fixed pitch angle.

9. The method according to claim 2, wherein the at least one wind turbine control motor comprises a yaw motor.

10. The method according to claim 9, further comprising: setting a pitch angle to a larger fixed angle for affected pitch control motor when a temperature for the yaw motor ranges above the first predetermined temperature and below the second predetermined temperature.

11. A wind turbine comprising:
    a wind turbine generator operatively connected through a rotor shaft to a rotor hub including at least one rotor blade;
    at least one wind turbine control motor;
    a wind turbine control system adapted for controlling operation of the wind turbine, including an operating scheme for the at least one wind turbine control motor;
    a control function of the wind turbine control system adapted for continuing operation of the wind turbine under a modified operating scheme for the at least one wind turbine control motor when an operating temperature of the at least one wind turbine motor exceeds a first predetermined temperature;
    a temperature measurement system for the at least one wind turbine control motor wherein a temperature measurement for the at least one wind turbine control motor is provided to the control function of the wind turbine control system.

12. The wind turbine according to claim 11, the control function further comprising: shutting down the wind turbine when the temperature of the wind turbine control motor exceeds a second predetermined temperature, wherein the second predetermined temperature is greater than the first predetermined temperature.

13. The wind turbine according to claim 11, wherein the temperature measurement for the at least one wind turbine control motor includes a winding temperature.

14. The wind turbine according to claim 12, further comprising: a wind speed monitoring function, including an instrument for measuring the wind speed in proximity to the wind turbine; a recording of a history of wind speeds in proximity to the wind turbine, and determination of a range of wind speeds for a time period prior to the temperature exceeding the first predetermined temperature for the at least one wind turbine control motor.

15. The wind turbine according to claim 13, the control function for the modified operating scheme comprising:
a setting for a pitch angle at a larger fixed angle for an affected pitch control motor with a temperature above the first predetermined temperature and below the second predetermined temperature.

16. The wind turbine according to claim 15, the setting for a larger pitch angle further comprising:
a setting of the larger fixed angle according to the range of wind speeds prior to the temperature for the at least one wind turbine control motor exceeding the first predetermined temperature.

17. The wind turbine according to claim 16, further comprising: an optimized converter torque control for the fixed pitch angle.

18. The wind turbine according to claim 16, the control function for the modified operating scheme further comprising:
shutdown of wind turbine operation if the temperature for the at least one wind turbine control motor exceeds a second predetermined temperature; and
restored normal control operation after the temperature for the at least one wind turbine control motor returns below the predetermined first temperature.

19. The wind turbine according to claim 18, wherein the at least one wind turbine control motor comprises at least one pitch control motor.

20. The wind turbine according to claim 18, wherein the at least one wind turbine control motor comprises a yaw motor and the control function further comprises: ceasing yaw motor operation when the temperature for the yaw motor exceeds a first predetermined temperature wind turbine.

* * * * *